(12) United States Patent
Kernwein et al.

(10) Patent No.: US 11,208,130 B2
(45) Date of Patent: Dec. 28, 2021

(54) METHOD AND APPARATUS TO IMPROVE UNMONITORED SWITCH POSITION REPORTING

(71) Applicant: Westinghouse Air Brake Technologies Corporation, Wilmerding, PA (US)

(72) Inventors: Jeffrey D. Kernwein, Cedar Rapids, IA (US); Craig Karl Green, Jefferson Hills, PA (US); Jerrid D. Chapman, Belle Vernon, PA (US); Sathya Vagheeswar Venkatasubramanian, Pittsburgh, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 365 days.

(21) Appl. No.: 16/206,558

(22) Filed: Nov. 30, 2018

(65) Prior Publication Data

US 2020/0172134 A1    Jun. 4, 2020

(51) Int. Cl.
*B61L 25/02*  (2006.01)
*G06K 9/00*   (2006.01)
*G05D 1/02*   (2020.01)

(52) U.S. Cl.
CPC .......... *B61L 25/025* (2013.01); *B61L 25/021* (2013.01); *B61L 25/028* (2013.01); *G05D 1/0223* (2013.01); *G05D 1/0246* (2013.01); *G05D 1/0285* (2013.01); *G06K 9/00791* (2013.01)

(58) Field of Classification Search
CPC .... B61L 25/025; B61L 25/021; B61L 25/028; G05D 1/0223; G05D 1/0246; G05D 1/0285; G06K 9/00791
See application file for complete search history.

(56) References Cited

U.S. PATENT DOCUMENTS

| 2010/0163687 A1* | 7/2010 | Brand | B61L 23/007 246/117 |
| 2013/0015298 A1* | 1/2013 | Cooper | B61L 3/065 246/182 R |
| 2013/0313372 A1* | 11/2013 | Gamache | B61K 9/12 246/169 D |
| 2015/0175179 A1* | 6/2015 | Green | B61L 19/06 246/27 |
| 2016/0046308 A1* | 2/2016 | Chung | B61L 25/021 701/20 |
| 2016/0257325 A1* | 9/2016 | Kernwein | B61L 11/08 |
| 2017/0306568 A1* | 10/2017 | Lichtberger | E01B 35/06 |
| 2018/0222505 A1* | 8/2018 | Chung | B61L 27/04 |

(Continued)

*Primary Examiner* — Jason C Smith
(74) *Attorney, Agent, or Firm* — The Small Patent Law Group LLC; Christopher R. Carroll

(57) ABSTRACT

A switch reporting device including at least one display screen, a high resolution camera, a code reader, at least one memory and one or more processors, the switch reporting device configured to determine a position of an unmonitored switch in a railway by capturing an image of one or more portions associated with the unmonitored switch, generating switch position data based on the image of one or more portions associated with the unmonitored switch, and updating a switch position record for the unmonitored switch with the switch position data. The switch reporting device includes one or more mobile computers or an EOT device for monitoring and reporting switch position data for an unmonitored switch.

18 Claims, 5 Drawing Sheets

(56) References Cited

U.S. PATENT DOCUMENTS

| | | | |
|---|---|---|---|
| 2018/0327010 A1* | 11/2018 | Kernwein | B61L 1/14 |
| 2020/0172134 A1* | 6/2020 | Kernwein | G06K 9/00791 |
| 2020/0202132 A1* | 6/2020 | Kernwein | G06T 7/0002 |
| 2020/0307614 A1* | 10/2020 | Jordan | B61L 27/0094 |

* cited by examiner

METHOD AND APPARATUS TO IMPROVE UNMONITORED SWITCH POSITION REPORTING

BACKGROUND

Field of the Invention

The present invention relates generally to an unmonitored switch reporting device, and, in particular, unmonitored switch reporting methods for reporting a current switch position.

Description of Related Art

There is a growing movement to transport more material by rail as production of goods reaches capacity. Additional and improved safety systems are necessitated to solve problems in current railway systems. Thus, there are efforts to improve the safety of systems used to determine the status of trackside equipment, including unmonitored switches, on the railway. Reporting of an unmonitored switch are made generally by onboard railway personnel to a central system to update the position of a switch that the train has just traversed.

Despite these efforts, the current method of reporting unmonitored switch positions can be unreliable, inaccurate, and involve manual intervention. For example, Positive Train Control (PTC) systems rely upon correct switch positioning for reliable speed protection of trains. However, the PTC system must have the correct position of switches on approach to correctly enforce speed limits through the area. In some non-limiting embodiments or aspects, switch positions are automatically reported by an installed monitoring system, but many systems rely on manual submission of the correct position (unmonitored switches). Accurate and reliable submission of the position of these unmonitored switches is crucial to the ability of the PTC system to protect the train.

Additionally, with the integration of PTC systems into the existing railway systems, it becomes increasingly important that the PTC system have accurate position information for any switches that the trains will be traversing as an input into the PTC system's collision avoidance and speed enforcement functions.

In some non-limiting embodiments or aspects, due to the size and complexity of existing railway systems, it would be prohibitively expensive and technically challenging to automatically monitor every switch. Accordingly, some unmonitored switches have been visually observed and their respective switch positions reported via radio for manual entry into the PTC system.

Unmonitored switches require a manual switch position update, sometimes based on switch position from reports, and generated by personnel onboard a train based on judgment of a switch as the train is passing by. A safety risk in the railway may involve an invalid record associated with an unmonitored switch in a remote server, the remote server (e.g., a dispatching server, wayside data management center, central computer, etc.) does not include a current switch position in a switch position record associated with a switch. As an example, when a report of the position of a switch that the train has just traversed is not updated, a subsequent train could derail or collide with another train because of the unreported switch position. In addition, the onboard personnel may need to report the switch position without access to parameters, displays, and buttons, for example, making an incomplete or inaccurate switch record update for the switch. Switch reporting also lacks verification, instead relying on a time consuming and unreliable human judgment, with verification of the switch position not established.

SUMMARY

In some non-limiting embodiments or aspects, provided are switch management systems, computer-implemented methods of determining an unmonitored switch position in a railway, and computer program products for determining an unmonitored switch position. Preferably, provided are improved systems, methods, and computer program products that overcome certain deficiencies and drawbacks associated with existing systems, methods, and computer program products for determining a position of an unmonitored switch.

In a non-limiting embodiment or aspect, provided is a computer-implemented method for determining a position of an unmonitored switch in a railway. The method may include: capturing an image of one or more portions associated with the unmonitored switch; generating switch position data based on the image of one or more portions associated with the unmonitored switch; and updating a switch position record for the unmonitored switch with the switch position data.

In another non-limiting embodiment or aspect, provided is a computer program product comprising at least one non-transitory computer-readable medium, including program instructions that, when executed by at least one computer including at least one processor, causes the at least one computer to: capture an image of one or more portions associated with an unmonitored switch; generate switch position data based on an image of a first portion of one or more portions associated with the unmonitored switch; generate a visual image based on an image of a second portion of one or more portions associated with the unmonitored switch; and update a switch position record for the unmonitored switch with the switch position data.

In another non-limiting embodiment or aspect, provided is a switch management system, including: a mobile device having a display screen, a high resolution camera, a code reader, a memory and a processor, the mobile device programmed or configured to: capture an image of one or more portions associated with an unmonitored switch; generate switch position data based on an image of a first portion of one or more portions associated with the unmonitored switch; generate a visual image based on an image of a second portion of one or more portions associated with the unmonitored switch; and update a switch position record for the unmonitored switch with the switch position data.

In another non-limiting embodiment or aspect, provided is a switch management method. The method may include: issuing an electronic command to at least one device at an end of a train to operate a camera for capturing at least one of a switch code or an image of a switch; capturing, on a mobile device having one or more processors, an image of one or more portions associated with an unmonitored switch; generating, by the mobile device, switch position data based on the image of one or more portions associated with the unmonitored switch, the switch position data including an identifier of a position of the unmonitored switch; and transmitting, by the mobile device, a status update to a central dispatcher, the status update including switch position data for identifying the unmonitored switch and a position image of the unmonitored switch.

The present invention is neither limited to nor defined by the above summary. Rather, reference should be made to the claims for which protection is sought with consideration of equivalents thereto.

Further preferred non-limiting embodiments or aspects will now be described in the following numbered clauses:

Clause 1: A computer-implemented method for determining a position of an unmonitored switch in a railway, the method comprising: capturing an image of one or more portions associated with the unmonitored switch; generating switch position data based on the image of one or more portions associated with the unmonitored switch; and updating a switch position record for the unmonitored switch with the switch position data.

Clause 2. The method according to clause 1, wherein the switch position data includes at least one of a switch position indicator of the unmonitored switch or switch position information for determining a switch position of the unmonitored switch, the method further comprising: generating switch position data to include an image of the switch position indicator based on a first portion of the image of one or more portions; and generating switch position data to include switch position information based on a second portion of the image of one or more portions associated with the unmonitored switch.

Clause 3: The method according to clauses 1 and 2, wherein capturing the image of one or more portions associated with the unmonitored switch further comprises: monitoring the unmonitored switch for a switch code in at least one portion of the unmonitored switch; communicating the switch code from at least one portion of the unmonitored switch, the switch code including embedded switch code information associated with a status of the unmonitored switch, the switch code information including information for identifying a position of the unmonitored switch; determining if the switch code is accessible in one or more portions associated with the unmonitored switch; and acquiring switch code data based on the one or more switch codes.

Clause 4: The method according to clauses 1-3, wherein acquiring switch code data further comprises: acquiring one of a plurality of switch codes, wherein a first switch code identifies a first position of the unmonitored switch, and one or more second switch codes identify one or more second positions of the unmonitored switch.

Clause 5: The method according to clauses 1-4, wherein at least one of the plurality of switch codes is acquired at least partially from the image of one or more portions.

Clause 6: The method according to clauses 1-5, wherein the switch position data includes a switch identifier, a location designation based on a location of the unmonitored switch in a geographic area, and a time stamp identifying a time the unmonitored switch was in a position.

Clause 7: The method according to clauses 1-6, wherein updating the switch position record for the unmonitored switch further comprises: transmitting switch position data to a wayside data management center including a switch identifier, a location designation based on a location of the unmonitored switch in a geographic area, and a time stamp identifying a time the unmonitored switch was in a position; receiving the switch position data; in response to receiving the switch position data, identifying the switch position record based on at least one of the switch identifier, the location designation, or the time stamp; determining a current switch position based on at least one of the switch position indicator of the unmonitored switch or switch position information including parameters and conditions of the unmonitored switch; determining a correct switch position of the switch based on the current switch position and a recorded switch position, the recorded switch position associated with a position of the switch in the switch record; and updating the switch record with the correct switch position.

Clause 8: The method according to clauses 1-7, comprising: configuring the unmonitored switch from a first position to a second position after a train has passed the unmonitored switch; and capturing the image of one or more portions after configuring the unmonitored switch.

Clause 9: A switch management system, comprising a mobile device having at least one display screen, a high resolution camera, a code reader, at least one memory and one or more processors, the mobile device configured to: capture an image associated with a first portion of one or more portions of an unmonitored switch; generate switch position data based on the image associated with the first portion of one or more portions of the unmonitored switch; generate a visual image based on the image associated with a second portion of one or more portions of the unmonitored switch; and update a switch position record for the unmonitored switch with the switch position data.

Clause 10: The switch management system according to clause 9, wherein the switch position data includes at least one of a switch position indicator of the unmonitored switch or switch position information for determining a switch position of the unmonitored switch, the switch management system further configured to: monitor one or more switches for a switch code from at least one portion of the unmonitored switch; generate switch position data to include the image of the switch position indicator based on the image associated with a first portion of one or more portions; and generate switch position data to include switch position information based on the image associated with a second portion of one or more portions of the unmonitored switch.

Clause 11: The switch management system according to clauses 9 and 10, further configured to: provide one or more switch codes in one or more portions associated with the unmonitored switch, the switch code including an identifier of a position of the unmonitored switch; determine if the switch code is accessible in one or more portions associated with the unmonitored switch; and acquire switch code data based on the one or more switch codes.

Clause 12: The switch management system according to clauses 9-11, further configured to: acquire one of a plurality of switch codes, wherein the first switch code identifies a first position of the unmonitored switch, and one or more second switch codes identify one or more second positions of the unmonitored switch.

Clause 13: The switch management system according to clauses 9-12, wherein at least one of the one or more switch codes is acquired at least partially from the image of one or more portions.

Clause 14: The switch management system according to clauses 9-13, wherein the switch position data includes a switch identifier, a location designation based on a location of the unmonitored switch in a geographic area, and a time stamp identifying a time the unmonitored switch was in a position.

Clause 15: The switch management system according to clauses 9-14, further configured to: transmit switch position data to a wayside data management center including a switch identifier, a location designation based on a location of the switch in a geographic area, and a time stamp identifying a time the unmonitored switch was in a position; receive the switch position data; in response to receiving the switch position data, the switch management system configured to: identify the switch position record based on at least one of the switch identifier, the location designation, or the time stamp; determine a current switch position based on at least one of a switch position indicator of the unmonitored switch or switch position information including parameters and conditions of the unmonitored switch; determine a correct switch position of the switch based on the current switch position and a recorded switch position, the recorded switch position associated with the position of the switch in the switch position record; and update the switch position record with the correct switch position.

Clause 16: The switch management system according to clauses 9-15, further configured to: adjust the unmonitored switch from a first position to a second position after a train has passed the unmonitored switch; and capture the image of one or more portions after configuring the unmonitored switch.

Clause 17: A switch management method, A switch management method, comprising: issuing an electronic command to at least one device at an end of a train to operate a camera for capturing at least one of a switch code or an image of a switch; capturing, on an EOT device, the image associated with one or more portions of an unmonitored switch; generating, by the EOT device, switch position data based on the image associated with one or more portions of the unmonitored switch, the switch position data including an identifier of a position of the unmonitored switch; and transmitting, by the EOT device, a status update to a dispatcher, the status update including switch position data for identifying the unmonitored switch and the position of the unmonitored switch.

Clause 18: The switch management method according to clause 17, comprising: receiving the status update at the dispatcher including one or more processors; in response to receiving the switch position data, identifying, by the dispatcher, a switch record based on at least one of a switch identifier, a location designation, or a time stamp; determining a current switch position based on at least one of a switch position indicator of the unmonitored switch or switch position information for determining a switch position of the unmonitored switch; determining a correct switch position of the switch based on the current switch position and a recorded switch position, the recorded switch position associated with a position of the switch in the switch record; and updating the switch record with the correct switch position.

Clause 19: The switch management method according to clauses 17 and 18, further comprising: configuring the unmonitored switch from a first position to a second position after the train has passed the unmonitored switch; and capturing the image of the one or more portions after configuring the unmonitored switch.

Clause 20: The switch management method according to clauses 17-19, wherein the switch position data includes at least one of a switch position indicator of the unmonitored switch or switch position information for determining a switch position of the unmonitored switch, the method further comprising: generating the switch position data based on the switch position indicator of a first portion of the one or more portions associated with the image of the unmonitored switch; and generating switch position data based on switch position information of a second portion of the one or more portions associated with the image of the unmonitored switch.

Clause 21: A method to arm one device with another device on a freight train having a locomotive and a last car, the method comprising: communicating a switch code on a portion of an unmonitored switch, the switch code including embedded switch code information associated with a status of the unmonitored switch; issuing an electronic command to an EOT device having a high resolution camera, the electronic command to operate a high resolution camera via a web user interface on a HOT device to acquire the accessible switch code and an image of one or more portions of the unmonitored switch, the image of the switch including a position indicator based on a position of the unmonitored switch; generating a status update by extracting switch code information from the switch code on the EOT device; transmitting the status update from the EOT device via the HOT device, the status update identifying the switch code information and the image of the unmonitored switch to a central dispatcher; and in response to receiving the status update at a central dispatch, determining a correct position of the switch and updating the status of the unmonitored switch at a central server.

Clause 22: The method according to clause 21, further comprising: communicating a switch code on a portion of an unmonitored switch, the switch code including embedded switch code information associated with a status of the unmonitored switch; issuing an electronic command to an EOT device having a high resolution camera, the electronic command to operate a high resolution camera via a web user interface on a HOT device to acquire the accessible switch code and an image of one or more portions of the unmonitored switch, the image of the switch including a position indicator based on a position of the unmonitored switch; generating a status update by extracting switch code information from the switch code on the EOT device; transmitting the status update from the EOT device via the HOT device, the status update identifying the switch code information and the image of the unmonitored switch to a central dispatcher; and in response to receiving the status update at a central dispatch, determining a correct position of the switch and updating the status of the unmonitored switch at a central server.

Clause 23: The method according to clauses 21 and 22, wherein acquiring switch code data, further comprises: acquiring one of a plurality of switch codes, wherein a first switch code identifies a specified (e.g., unique, identifying, etc.) first position of the unmonitored switch, and one or more second switch codes identify one or more specified second positions of the unmonitored switch.

Clause 24: A computer program product comprising at least one non-transitory computer-readable medium including program instructions that, when executed by at least one computer including at least one processor, causes the at least one computer to: generate switch position data based on an image of a first portion of one or more portions associated with the unmonitored switch; generate a visual image based on an image of a second portion of one or more portions associated with the unmonitored switch; and update a switch position record for the unmonitored switch with the switch position data.

Clause 25: The computer program product of clause 24, wherein the switch position data includes at least one of a switch position indicator of the unmonitored switch or switch position information for determining a switch position of the unmonitored switch, wherein the program instructions, when executed by at least one computer including at least one processor, causes the at least one computer to generate switch position data to include an image of a switch position indicator based on a first portion of the image of one or more portions; and generate switch position data to include switch position information based on a second portion of the image of one or more portions associated with the unmonitored switch.

Clause 26: The computer program product of clauses 24 and 25, wherein the program instructions, when executed by at least one computer including at least one processor, causes the at least one computer to provide one or more switch codes in one or more portions associated with the unmonitored switch, the switch code including an identifier of a position of the unmonitored switch; determine if a switch code is accessible in one or more portions associated with the unmonitored switch; and acquire switch code data based on the one or more switch codes.

Clause 27: The computer program product of clauses 24-26, wherein the program instructions, when executed by at least one computer including at least one processor, causes the at least one computer to transmit switch position data to a wayside data management center including a switch identifier, a location designation based on a location of the switch in a geographic area, and a time stamp identifying a time the unmonitored switch was in a position; receive the switch position data; in response to receiving the switch position data, the switch management system configured to: identify a switch record based on at least one of the switch identifier, a location designation, or a time stamp; determine a current switch position based on at least one of a switch position indicator of the unmonitored switch or switch position information including parameters and conditions of the unmonitored switch; determine a correct switch position of the switch based on the current switch position and a recorded switch position, the recorded switch position associated with a position of the switch in the switch record; and update the switch record with a correct switch position.

Clause 28: The computer program product of clauses 24-27, wherein the program instructions, when executed by at least one computer including at least one processor, causes the at least one computer to configure the unmonitored switch from a first position to a second position after a train has passed the unmonitored switch; and capture the image of one or more portions after configuring the unmonitored switch.

Clause 29: A switch management method comprising: issuing an electronic command to at least one device at an end of a train operate a camera for capturing at least one of a switch code or an image of a switch; capturing, on a mobile device having one or more processors, an image of one or more portions associated with an unmonitored switch; generating, by the mobile device, switch position data based on the image of one or more portions associated with the unmonitored switch, the switch position data including an identifier of a position of the unmonitored switch; and transmitting, by the mobile device, a status update to a central dispatcher, the status update including switch position data for identifying the unmonitored switch and a position image of the unmonitored switch.

Clause 30: The switch management method of clause 29, further comprising: receiving the status update at a wayside management computer including one or more processors; in response to receiving the switch position data, identifying, by the wayside management computer, a switch record based on at least one of a switch identifier, a location designation, or a time stamp; determining a current switch position based on at least one of a switch position indicator of the unmonitored switch or switch position information for determining a switch position of the unmonitored switch; determining a correct switch position of the switch based on the current switch position and a recorded switch position, the recorded switch position associated with a position of the switch in the switch record; and updating the switch record with a correct switch position.

Clause 31: A switch reporting method to monitor and report an unmonitored switch from an EOT device on a freight train having a locomotive and a last car, the method comprising: communicating a switch code on a portion of an unmonitored switch, the switch code including embedded switch code information associated with a status of the unmonitored switch; issuing an electronic command to an EOT device having a high resolution camera, the electronic command to operate a high resolution camera via a web user interface on a HOT device to acquire the accessible switch code and an image of one or more portions of the unmonitored switch, the image of the switch including a position indicator based on a position of the unmonitored switch; generating a status update by extracting switch code information from the switch code on the EOT device; transmitting the status update from the EOT device via the HOT device, the status update identifying the switch code information and the image of the unmonitored switch to a central dispatcher; and in response to receiving the status update at a central dispatch, determining a correct position of the switch and updating the status of the unmonitored switch at a central server.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

DETAILED DESCRIPTION

Figure 1:
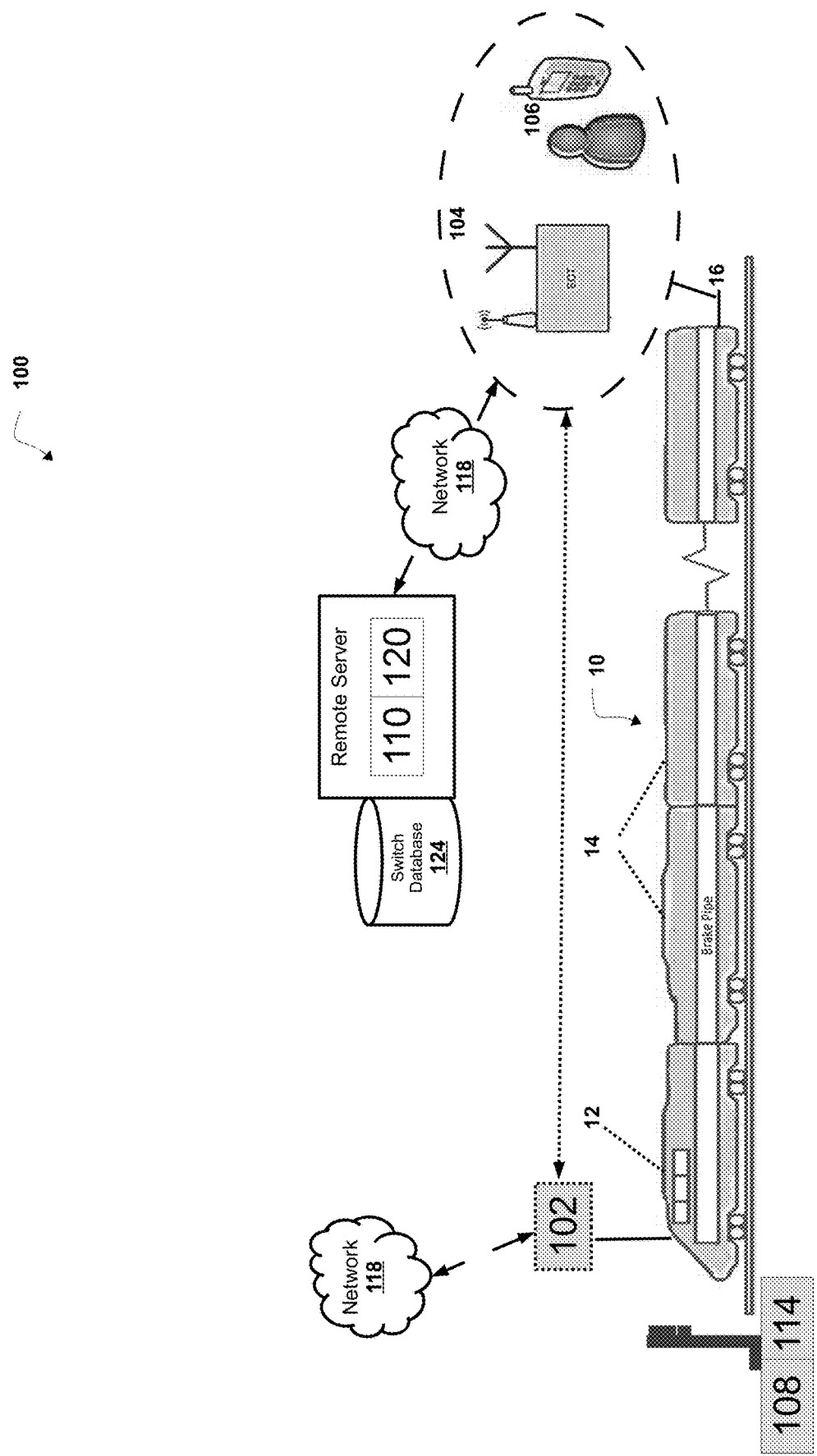
FIG. 1 illustrates a train and an unmonitored switch reporting system according to a non-limiting embodiment or aspect.

As disclosed herein, in some non-limiting embodiments or aspects, a switch reporting method to monitor and report an unmonitored switch using a device or combination of devices (e.g., an EOT device, a switch reporting device, an on-board computer, a remote server, etc.) on a freight train having a locomotive and a last car, may include monitoring and communicating a switch code on a portion of an unmonitored switch, the switch code including embedded switch code information associated with a status of the unmonitored switch; issuing an electronic command to an EOT device having a high resolution camera, the electronic command to operate a high resolution camera via a web user interface on a HOT device to acquire the accessible switch code and an image of one or more portions of the unmonitored switch, the image of the switch including a position indicator based on a position of the unmonitored switch; generating a status update by extracting switch code information from the switch code on the EOT device; transmitting the status update from the EOT device via the HOT device, the status update identifying the switch code information and the image of the unmonitored switch to a central dispatcher; and in response to receiving the status update at a central dispatch, determining a correct position of the switch and updating the status of the unmonitored switch at a central server.

In this way, the switch reporting method monitors, reports, and maintains a switch position associated with the unmonitored switch. Accordingly, the switch reporting method reduces or eliminates a processing delay associated with traversing an unmonitored switch. For example, the switch reporting method reduces or eliminates a manual switch position update, generated by personnel onboard a train based on judgment of a switch as the train is passing by. Additionally, and/or alternatively, a safety risk in the railway involving an invalid record (e.g., a switch record including a switch position in a switch database, etc.) associated with an unmonitored switch in a remote server is avoided if a remote server (e.g., a dispatching server, wayside data management center, central computer, etc.) does not include a current switch position in a switch position record associated with a switch. In some non-limiting embodiments or aspects, when a report of the position of a switch that the train has just traversed is updated, efficiency and accuracy is achieved in the monitoring and reporting of a position of an unmonitored switch when a subsequent train avoids a hazardous condition (e.g., derailment, etc.). In addition, accuracy is improved by the switch reporting method to report the switch position based on access (e.g., access to parameters, displays, and buttons), to update an incomplete, unverified, or inaccurate switch record associated with the switch.

It is to be understood that the invention may assume various alternative variations and step sequences, except where expressly specified to the contrary. It is also to be understood that the specific products, systems, and processes illustrated in the attached drawings, and described in the following specification, are simply exemplary embodiments or aspects of the invention. Hence, specific dimensions and other physical characteristics related to the embodiments or aspects disclosed herein are not to be considered as limiting. As used herein, the singular form of "a," "an," and "the" include plural referents unless the context clearly dictates otherwise.

As used herein, the terms "communication" and "communicate" refer to the receipt, transmission, or transfer of one or more signals, messages, commands, or other types of data. For one unit or device to be in communication with another unit or device means that the one unit or device is able to receive data from and/or transmit data to the other unit or device. A communication device may use a direct or indirect connection and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, Global System for Mobile Communications (GSM), and/or the like.

Additionally, two units or devices in communication with each other, may be using an encoding protocol. For example, a QR code uses four standardized encoding modes (numeric, alphanumeric, byte/binary, and kanji) to efficiently store data. A QR code consists of black modules (square dots) arranged in a square grid on a white background. These can be read by an imaging device (such as a camera) and processed using Reed-Solomon error correction until the image can be appropriately interpreted. The QR data are then extracted from patterns present in both horizontal and vertical components of the image.

Additionally, an unmonitored switch includes one or more switches on the wayside that are not electronically communicating (e.g., not directly, indirectly, or automatically communicating a switch position to a remote server). For example, in a monitored switch, an object on the wayside associated with a switch is capable of transmitting data associated with the switch position (e.g., directly, indirectly, or automatically communicating a switch position to a remote server). A switch position can include any position of the switch associated with the alignment of a railway switch or any position on a switch position indicator. The switch position indicator is provided on a switch as an indicator of the currently configured switch alignment of a switch. In some non-limiting embodiments or aspects, a switch position indicator provides information about a switch alignment in a railway track, the switch alignment including a normal leg (e.g., main leg or first section of track) and a reverse leg (e.g., siding leg or second section of track). In some non-limiting embodiments or aspects, a switch including a switch position indicator signals a normal position for entry on a normal leg of a switch and a switch position indicator signals a reverse position for entry on a reverse leg of a switch.

In a non-limiting embodiment or aspect, an unmonitored switch reporting system for a train may include a switch reporting device and a remote server. The switch reporting device may include a communication device, a sensor, and/or a computer.

In a non-limiting embodiment or aspect, the switch reporting device may be located on or associated with a train.

In a non-limiting embodiment or aspect, the switch reporting device may include a Smart Cellular Phone, an EOT device, or another mobile computer used by the train crew to gather any Information concerning the identification of the unmonitored switch, along with the position of the switch.

In a non-limiting embodiment or aspect, the switch reporting device may transmit or communicate this information to a remote computer (e.g., wayside management system, dispatching center for entry into the system and archiving, etc.).

In a non-limiting embodiment or aspect, the switch reporting device may include a software application for gathering any of the information (e.g., a QR code of a switch name, a location and position, a picture of the switch position, any GPS coordinates, and a timestamp). The software application may include programming instructions for transmitting (e.g., via a cellular network, wireless network, etc.) to a central dispatching system (e.g., remote server, etc.) for reporting and archiving.

In a non-limiting embodiment or aspect, the switch reporting device may be configured to sense or determine a condition or status associated with a portion of an unmonitored switch.

In a non-limiting embodiment or aspect, the switch reporting device may be located on or associated with the train, or located in, configured in, or associated with an EOT device of the train, or located in or associated with an end of train railcar of the train.

In a non-limiting embodiment or aspect, the communication device may be programmed or configured to receive, process, and/or transmit data.

In a non-limiting embodiment or aspect, the switch reporting device may be programmed or configured to sense or determine a location of the unmonitored switch.

In a non-limiting embodiment or aspect, the switch reporting device may be programmed or configured to determine or receive a position of at least a portion of the unmonitored switch based at least partially on the location or position sensed or determined by the at least one positioning system.

In a non-limiting embodiment or aspect, the switch reporting device may be programmed or configured to determine or receive a location of at least a portion of the unmonitored switch based at least partially on the location or position sensed or determined by the at least one positioning system.

In a non-limiting embodiment or aspect, the switch reporting device may be programmed or configured to directly or indirectly communicate a report of an unmonitored switch to a remote server, an end of train device, a head of train computer located in locomotive or associated with a railcar at a head of the train, or any combination thereof.

In a non-limiting embodiment or aspect, the remote server may be in direct or indirect communication with the switch reporting device.

In a non-limiting embodiment or aspect, the remote server may be on a server located at a central location and programmed or configured to generate or receive a notification based at least partially on the condition or parameter sensed or determined by the switch reporting device.

In a non-limiting embodiment or aspect, the remote server may be programmed or configured to determine or receive a location or report of a position of at least a portion of the unmonitored switch based at least partially on the location or position sensed or determined by the at least one positioning system.

In a non-limiting embodiment or aspect, the remote server may include a software application running on a server computer (e.g., remote, local, etc.) including or associated with the main repository of all unmonitored switch position information. In some non-limiting embodiments or aspects, one or more switch reporting devices will connect or couple with this central server application. In some non-limiting embodiments or aspects, one or more switch reporting devices will transmit captured, generated, acquired, entered, or determined data associated with an unmonitored switch that is being recorded. In some non-limiting embodiments or aspects, the server application will receive the switch information that is to be recorded, archive all information that has been captured for that switch, and make the information available to the dispatch personnel.

In a non-limiting embodiment or aspect, the remote server may be programmed or configured to directly or indirectly communicate a report of an unmonitored switch report to an on-board computer located in or associated with a locomotive of the train, an EOT device located in or associated with a railcar of the train, a remote server associated with a specified entity, or any combination thereof.

In another non-limiting embodiment or aspect, an unmonitored switch reporting system for a train may include means for sensing or determining a condition or parameter associated with a switch, means for receiving, processing, and/or transmitting switch position data; means for sensing or determining a position of at least a portion of the unmonitored switch, means for sensing or determining a location of the unmonitored switch, and means for generating or receiving a switch report based at least partially on the switch position data sensed or determined, and for directly or indirectly communicating a report of the unmonitored switch to at least one of the following: an on-board computer located in or associated with the at least one locomotive of the train; an EOT device located in or associated with at least one railcar of the train; a remote server associated with a specified entity, or any combination thereof.

Referring now to FIG. 1, FIG. 1 is a diagram of a non-limiting embodiment or aspect of a switch reporting system 100 in which systems and/or methods, described herein, can be implemented. As shown in FIG. 1, train 10 includes a locomotive 12, one or more railcars 14 and an end of train 16, and FIG. 1 further illustrates a non-limiting embodiment or aspect of an unmonitored switch reporting system. Systems and/or devices of switch reporting system 100 can interconnect via wired connections, wireless connections, or a combination of wired and wireless connections.

With continued reference to FIG. 1, a non-limiting embodiment or aspect of a switch reporting system 100 may include an on-board computer 102 located in or associated with the locomotive 12 of the train 10. In a non-limiting embodiment or aspect, the on-board computer 102 may form part of, may include, or may be connected to a switch reporting device 104.

In a non-limiting embodiment or aspect, switch reporting system 100 includes the switch reporting device 104. In some non-limiting embodiments or aspects, the switch reporting device 104 may form part of, include, or may be connected to an end of train ("EOT") device, a mobile device 106, or a head of train ("HOT") device. In some non-limiting embodiments or aspects, the switch reporting device 104 directly and/or indirectly captures, generates, or reports switch position data associated with the status of an unmonitored switch 108 in the railway of train 10. In some non-limiting embodiments or aspects, the switch reporting device 104 may directly or indirectly determine a status of the unmonitored switch including a position associated with one or more portions 114 (e.g., a switch position indicator, switch points), one or more representations (e.g., codes, numbers, letters, etc.), switch mechanism (e.g., lever, etc.) associated with the switch, and a signal of an unmonitored switch 108.

In a non-limiting embodiment or aspect, the switch reporting device 104 may directly or indirectly communicate via one or more networks 118.

In a non-limiting embodiment or aspect, the switch reporting device 104 generates switch position data associated with a status or a position of an unmonitored switch. In a non-limiting embodiment or aspect, a switch position report (e.g., a notification and/or update including and/or associated with the switch position data), communicated by the switch reporting device 104, includes a switch position report (e.g., images, photographs, or audio and/or video information) received via an input device associated with the switch reporting device 104, the on-board computer 102, or the EOT device (EOT). By way of a non-limiting embodiment or aspect, the switch reporting device 104 generates a switch position report, including an image of the unmonitored switch.

In a non-limiting embodiment or aspect, the switch reporting device 104 includes an input device. An input device may include but is not limited to a keyboard, mouse, joystick, audio input, and/or video input. An input device may include a static input device and/or a mobile input device. By way of another non-limiting embodiment or aspect, the static input device may include a mounted microphone and/or mounted camera. By way of a non-limiting embodiment or aspect, the mobile input device may include a handheld phone and/or handheld camera. The input device may include a static input device and/or a mobile input device. By way of a non-limiting embodiment or aspect, the static and/or mobile output device may include an audio output device, such as a speaker and/or a display, and/or a video output device, such as handheld phone or handheld display. By way of a non-limiting embodiment or aspect, the input device and the output device may be the same or separate devices and/or systems.

In a non-limiting embodiment or aspect, the switch reporting device 104 directly acquires an image of one or more portions of the unmonitored switch. In some non-limiting embodiments or aspects, the switch reporting device 104 acquires an image of one or more portions of the unmonitored switch 108 based on an image of at least a first portion of the unmonitored switch 108. By way of a non-limiting embodiment or aspect, the switch reporting device 104 generates switch position data based on an image of one or more portions of the unmonitored switch.

In a non-limiting embodiment or aspect, the switch reporting device 104 may further include a web portal. The web portal may be an interface through which railroads may define users and actions associated with maintaining a status of one or more unmonitored switches. By way of a non-limiting embodiment or aspect, the web portal may display alerts and report events associated with one or more unmonitored switches.

In a non-limiting embodiment or aspect, the unmonitored switch reporting system may further include a computer application, such as a smart phone application, through which users may receive push notifications. By way of a non-limiting embodiment or aspect, the push notifications may depend on the role of the users, such as whether the users are associated with the railroad for the train 10, or is associated with another specified entity, such as a first responder.

In some non-limiting embodiments or aspects, the switch reporting device 104 captures, receives, or remotely executes a command to capture an image of the unmonitored switch 108. For example, switch reporting device 104 includes a sensor (e.g., camera, etc.) for capturing an image of the unmonitored switch 108, capturing an image based on data received or derived from an image of the unmonitored switch 108, or capturing an image from a stream of images, a video stream, or some other stream of switch position data. By way of a non-limiting embodiment or aspect, the switch reporting device 104 is programmed or configured to execute, capture, receive, or remotely capture an image of the switch position indicator in a first portion of one or more portions of the unmonitored switch 108. In a non-limiting embodiment or aspect, the switch reporting device 104 may directly and/or indirectly capture or generate a report based on a condition or parameter concerning the status of an unmonitored switch 108 in the railway of train 10, and/or the switch reporting device 104 may directly or indirectly determine a position associated with a sensed or determined one or more portions 114 of the unmonitored switch 108.

In a non-limiting embodiment or aspect, the switch reporting device 104 generates or receives, either directly or indirectly, switch position data concerning a status of an unmonitored switch 108. In some non-limiting embodiments or aspects, the switch reporting device 104 generates or receives switch position data to update a status or position of an unmonitored switch 108, including a position or status based on previously generated switch position data. In some non-limiting embodiments or aspects, the switch reporting device 104 may directly or indirectly communicate an updated switch position report to a remote server 110. In some non-limiting embodiments or aspects, the remote server 110 (e.g., a dispatching server, wayside data management center, central computer, etc.) is directly or indirectly connected to a switch position database 124 associated with the unmonitored switch 108. By way of a non-limiting embodiment or aspect, the switch reporting device 104 may directly or indirectly communicate via a cellular network, switch position data to a communication device 120 of the remote server 110 for monitoring an unmonitored switch 108, train 10, or switch reporting device 104, and communicate with the on-board computer 102 or a central computer by other methods, including but not limited to an on-board network, phone calls and/or text messages.

In some non-limiting embodiments or aspects, switch position database 124 includes a track database (e.g., a switch identifier, switch locations) and information about switch positions or locations (e.g., a location designation based on a location of the unmonitored switch 108 in a geographic area), a time stamp (e.g., time stamp identifying a time the unmonitored switch 108 was in a specified position), information about track positions or locations, track heading changes (e.g., curves, distance measurements), train consist information, (e.g., the number of locomotives, the number of cars, the total length of the train, and the like).

Returning to FIG. 1, the switch reporting device 104 according to a non-limiting embodiment or aspect may directly or indirectly communicate the switch position data. By way of example, the switch reporting device 104 is capable of communicating, capturing, and/or receiving a switch code from at least one portion of an unmonitored switch 108. In some non-limiting embodiments or aspects, a switch code includes embedded switch position data associated with a status or position of the unmonitored switch 108, the switch position data including information for identifying a position of the unmonitored switch 108.

In some non-limiting embodiments or aspects, the switch reporting device 104 acquires switch code data based on the one or more switch codes.

In some non-limiting embodiments or aspects, the switch reporting device 104 communicates switch position data to a remote server 110 (e.g., a dispatching entity to which all notifications of unmonitored switch reports are directly or indirectly communicated). By way of a non-limiting embodiment or aspect, switch reporting device 104 communicates a switch position report directly or indirectly to the remote server 110, and the unmonitored switch 108 of a railway may be configured in accordance with the switch position report.

In some non-limiting embodiments or aspects, the identity of the unmonitored switch 108 may be sent to the remote server 110 with the switch position report, or the identity of the switch position report may be sent separately.

In a non-limiting embodiment or aspect, the remote server 110 may include a database of previous switch status and/or positions based on communications or updates of unmonitored switches. The database of database of previous switch status and/or positions including historical information about the switches that is required, encouraged, and/or accepted by a specified entity, such as a central office associated with the switch, the train, another train, a central office associated with another train, a maintenance entity, a dispatch entity, an agency related to railway and track security, or any combination thereof. In a non-limiting embodiment or aspect, the database of previous switch status and/or positions may include contact information for railroads.

In a non-limiting embodiment or aspect, the on-board computer 102 may directly and/or indirectly communicate via one or more communication networks 118. In a non-limiting embodiment or aspect, the on-board computer 102 may form part of, may include, or may be connected to another device and/or system with a separate function in the locomotive 12, such as a Positive Train Control (PTC) system, a head-end-unit system, and/or a locomotive cab unit system. In another non-limiting embodiment or aspect, the on-board computer 102 may be a separate device and/or system.

In a non-limiting embodiment or aspect, a switch position report may result in a track restriction so that other trains would be aware of the incident and take appropriate actions.

In a non-limiting embodiment or aspect, the on-board computer 102 directly or indirectly communicates the switch position report of the unmonitored switch's position status before or after validation or invalidation, or directly or indirectly communicates the switch position report without validation or invalidation. By way of a non-limiting embodiment or aspect, the on-board computer 102 may directly or indirectly communicate a notification of the switch position report to a remote server 110 associated with the unmonitored switch 108 before validation or invalidation. In this case, the remote server 110 associated with the unmonitored switch 108 may be a remote server 110 associated with a central office associated with the train 10 according to a non-limiting embodiment or aspect.

After validation of the occurrence of the unmonitored switch, remote server 110 may directly or indirectly communicate a notification of a status or position of the unmonitored switch 108 to a remote server 110 associated with another train or entity. In this case, the remote server 110 associated with a specified unmonitored switch 108 may be a remote server 110 associated with a dispatcher service associated with the train 10 according to a non-limiting embodiment or aspect. According to another non-limiting embodiment or aspect, the remote server 110 may be associated with a specified entity other than the central office associated with the train.

By way of non-limiting embodiments or aspects, the on-board computer 102 may directly or indirectly communicate the switch position report to a remote server 110 of a central office associated with the train 10 before validation or invalidation of a position or status of the unmonitored switch 108 and may again directly or indirectly communicate a notification of the validated position or status of the unmonitored switch 108 to the remote server 110 of a dispatcher service associated with the train 10 and/or to another remote server 110 associated with a specified entity other than the dispatcher service associated with the train 10.

By way of another non-limiting embodiment or aspect, the switch reporting device 104 may wait for validation or invalidation before directly or indirectly communicating the switch position report of the unmonitored switch 108 to a remote server 110 associated with a specified entity. After validation or invalidation, the switch reporting device 104 may directly or indirectly communicate the switch position report of the unmonitored switch 108 to the remote server 110 of the central office associated with the train 10 and/or to another remote server 110 associated with another specified entity.

After invalidation of the position of the unmonitored switch, the remote server 110 may directly or indirectly communicate a notification of the invalidated unmonitored switch position to remote server 110 associated with a specified entity. By way of non-limiting embodiment or aspect, the remote server 110 may be the remote service of a central office associated with the train 10. By way of another non-limiting embodiment or aspect, the remote server 110 may be the remote server 110 associated with a specified entity other than the central office associated with the train 10.

For validation, the switch reporting device 104 may validate or invalidate the switch position of the unmonitored switch 108 by communicating with an engineer of the train 10, a remote engineer associated with the remote server 110, and/or by relying on other information in the switch position database. By way of a non-limiting embodiment or aspect, a notification of at least one condition or parameter sensed or determined by a second switch reporting device 104 may be used to validate the at least one condition or parameter sensed or determined by a first switch reporting device 104.

In the case of validating or invalidating the switch position of the unmonitored switch 108, the switch reporting device 104 may include and/or be in communication with one or more input devices and/or one or more output devices. An input device may include but is not limited to a keyboard, mouse, joystick, audio input, and/or video input. An input device may include a static input device and/or a mobile input device. By way of another non-limiting embodiment or aspect, the static input device may include a mounted microphone and/or mounted camera. By way of a non-limiting embodiment or aspect, the mobile input device may include a handheld phone and/or handheld camera. The input device may include a static input device and/or a mobile input device. By way of a non-limiting embodiment or aspect, the static and/or mobile output device may include an audio output device, such as a speaker and/or a display, and/or a video output device, such as handheld phone or handheld display. By way of a non-limiting embodiment or aspect, the input device and the output device may be the same or separate devices and/or systems.

In a non-limiting embodiment or aspect, the on-board computer 102 may receive a switch report associated with the unmonitored switch 108 in the railway from an engineer of the train 10 via an input device with or without a condition being previously sensed or determined. In this case, the on-board computer 102 may directly or indirectly communicate the switch report associated with the unmonitored switch 108 to a remote server 110 of a central office associated with the train 10.

With continued reference to FIG. 1, the unmonitored switch reporting system 100 may include an EOT device (EOT), which may be located in or associated with a railcar 14 or the end of train 16.

In a non-limiting embodiment or aspect, the EOT device (EOT) may form part of, may include, or may be connected to another device and/or system located in or associated with the railcar 14. By way of a non-limiting embodiment or aspect, another device and/or system may include a smart EOT device (EOT) that includes a flashing rear-end device, a camera, a device and/or system that monitors brake line pressure, a device and/or system that monitors for accidental separation of the train, and/or a device and/or system that transmits data to the locomotive 12. In another non-limiting embodiment or aspect, the EOT device (EOT) may be a separate device and/or system. The separate device and/or system may be a static device and/or system or a mobile device and/or system.

In a non-limiting embodiment or aspect, the EOT device (EOT) may be in direct or indirect communication with one or more on-board computers 102, one or more switch reporting devices 104, one or more wayside computers and/or devices, one or more remote servers 110, one or more positioning devices, and/or one or more sensors.

In a non-limiting embodiment or aspect, the EOT device (EOT) may directly or indirectly communicate via one or more networks 118.

In a non-limiting embodiment or aspect, the EOT device (EOT) may directly and/or indirectly receive a notification concerning the occurrence of a condition sensed or determined from an unmonitored switch.

In some non-limiting embodiments, EOT device (EOT) directly or indirectly communicates the switch position data to the on-board computer 102 or the switch reporting device 104, and the EOT device (EOT) may directly or indirectly receive confirmation of receipt of the switch position data directly or indirectly communicated from the EOT device (EOT) to the on-board computer 102 or the switch reporting device 104. By way of a non-limiting embodiment or aspect, the EOT device (EOT) may receive the confirmation of receipt after communicating a request for a confirmation of receipt, or may receive the confirmation of receipt, without or before communicating a request for a confirmation of receipt, of the notification to the on-board computer 102 or switch reporting device 104.

In a non-limiting embodiment or aspect, the EOT device (EOT) may receive location data about the unmonitored switch 108. In an additional non-limiting embodiment or aspect, the EOT device (EOT) may directly or indirectly communicate the location of the train 10, the end of train 16, and/or the unmonitored switch 108 to the on-board computer 102, to a wayside management computer, and/or to a remote server 110.

With continued reference to FIG. 1, the switch reporting system according to a non-limiting embodiment or aspect may include a wayside computer located alongside or associated with a portion of a track. The wayside computer may form part of, may include, or may be connected to another device and/or system located in or associated with the portion of the track. By way of a non-limiting embodiment or aspect, the wayside computer may form part of, may include, or may be connected to a wayside data communication device and/or system and/or an automatic train operation device and/or system. By way of another non-limiting embodiment or aspect, the wayside computer may be a separate device and/or system.

In a non-limiting embodiment or aspect, the wayside computer may be in direct or indirect communication with one or more on-board computers 102, one or more switch reporting devices 104, one or more EOT devices (EOT), one or more remote servers 110, and one or more sensors. In a non-limiting embodiment or aspect, the wayside computer may directly or indirectly communicate via one or more communication devices.

In a non-limiting embodiment or aspect, the wayside computer may directly and/or indirectly receive a notification concerning the occurrence of a condition or parameter sensed or determined from an unmonitored switch 108. In a case that a notification concerning the occurrence of a condition or parameter sensed or determined from an unmonitored switch 108 is directly or indirectly received by the wayside computer, the wayside computer may directly or indirectly communicate a switch report to an on-board computer 102, to an EOT device (EOT), and/or to a remote server 110 associated with a specified entity.

For validation, the remote server 110 may validate or invalidate the switch position data and/or position of an unmonitored switch 108 by validating or invalidating the switch position data and/or position of an unmonitored switch 108 based on directly or indirectly communicating with an engineer of the train 10 and/or by validating or invalidating the switch position data and/or position of an unmonitored switch 108 with other information, such as by receiving a notification of at least one condition sensed or determined by a second switch reporting device 104, on a same or different railcar 14 as the first switch reporting device 104, from which a notification of at least one condition was received.

In a non-limiting embodiment or aspect, the remote server 110 may validate or invalidate the switch position data and/or position of an unmonitored switch 108 based on directly or indirectly communicating with an engineer of the train 10 by directly or indirectly communicating a notification of a condition or parameter sensed or determined by the switch reporting device 104 to an engineer of the train 10 via an output device associated with the locomotive or the engineer. In another non-limiting embodiment or aspect, the remote server 110 may further request validation or invalidation from the engineer of the switch position data and/or position of an unmonitored switch 108 via an input device (e.g., an input device associated with a display, etc.) associated with the locomotive or the engineer. If validation of the switch position data and/or position of an unmonitored switch 108 is received via the input device, then the remote server 110 may directly or indirectly communicate a notification of the switch position data and/or position of an unmonitored switch 108 to a remote server 110 associated with another specified entity as described above.

If no validation or invalidation of the unmonitored switch position is received via the input device, which may result due to the unavailability of the engineer, then the remote server 110 may directly or indirectly communicate the switch position data to another remote server 110.

In a non-limiting embodiment or aspect, the remote server 110 may receive a notification of the switch position data and/or position of an unmonitored switch 108 from an engineer of the train 10 via an input device associated with the locomotive 12 or the engineer without receiving a notification concerning the occurrence of a condition sensed or determined by switch reporting device 104. In another non-limiting embodiment or aspect, the remote server 110 may further directly or indirectly communicate the notification of the switch position data and/or position of an unmonitored switch 108 to another remote server 110 of another specified entity.

In another non-limiting embodiment or aspect, the remote server 110 may receive the switch position data and/or position of an unmonitored switch 108 from an EOT device (EOT) or a wayside computer. By way of non-limiting embodiments or aspects, the notification of the switch position data and/or position of an unmonitored switch 108 from an EOT device (EOT) and/or computer or a wayside computer may be received before or after validation of the switch position data and/or the position of an unmonitored switch 108, or may be received before or after confirmation of receipt of a notification is directly or indirectly communicated from the EOT device (EOT) or the wayside computer to the switch reporting device 104.

In a non-limiting embodiment or aspect, the remote server 110 may include an event log in the form of a data storage device and/or system. By way of a non-limiting embodiment or aspect, the event log may record the occurrence of a condition sensed or determined and associated with a validated position of an unmonitored switch 108, an invalidated unmonitored switch 108, and/or a notification of an unmonitored switch position from an engineer of the train 10 via an input device.

In a non-limiting embodiment or aspect, the remote server 110 may include a switch position record and/or log in the form of an unmonitored switch record in a data storage device and/or system. By way of a non-limiting embodiment or aspect, the switch position log may record the type of unmonitored switch 108, the location of the unmonitored switch 108, the last valid configuration of the unmonitored switch 108, and/or the location of the unmonitored switch 108. In some non-limiting embodiments or aspects, the remote server 110 associated with a central office of the train may communicate at least a portion of the switch position data with the unmonitored switch 108, or an image of one or more portions of the unmonitored switch 108 may be sent separately.

Figure 2:
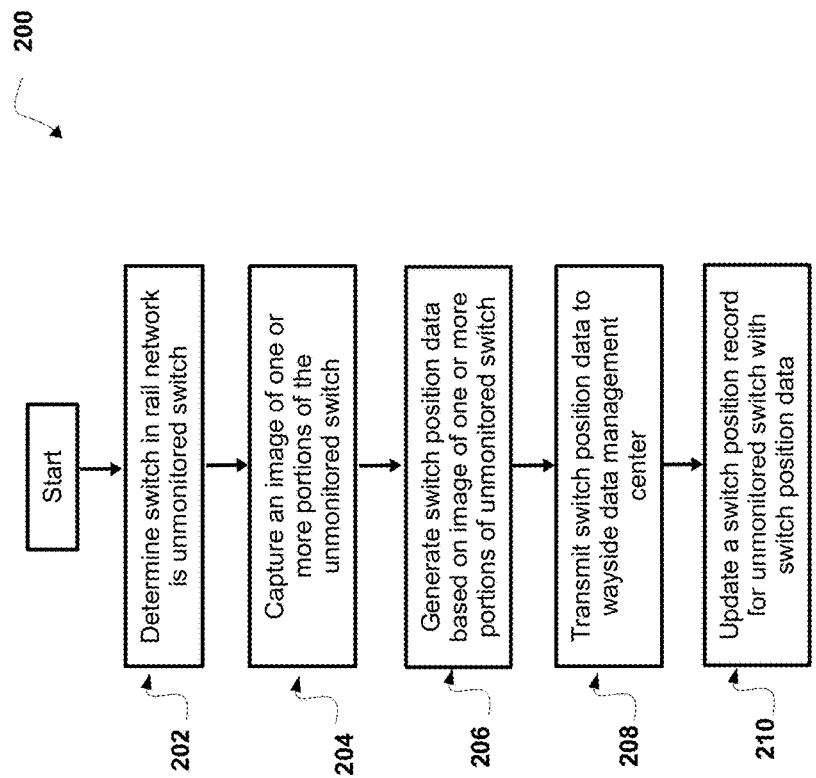
FIG. 2 illustrates a flowchart of a non-limiting embodiment or aspect of a process for determining a vehicle pose according to a non-limiting embodiment or aspect.

Referring now to FIG. 2, FIG. 2 is a flowchart of a non-limiting embodiment or aspect of a process 200 for monitoring a switch in a railway. In some non-limiting embodiments or aspects, one or more of the steps of process 200 are performed (e.g., completely, partially, etc.) by switch reporting device 104 (e.g., one or more devices of switch reporting device 104). In some non-limiting embodiments or aspects, one or more of the steps of process 200 are performed (e.g., completely, partially, etc.) by another device or a group of devices separate from or including switch reporting device 104, such as on-board computer 102, EOT device (EOT), or remote server 110 (e.g., one or more devices of remote server 110).

As shown in FIG. 2, at step 202, process 200 includes determining a switch in a railway is an unmonitored switch. For example, in some non-limiting embodiments or aspects, switch reporting device 104 determines an unmonitored switch 108 includes one or more switches on the wayside that are not electronically communicating, directly or indirectly, a switch position to a remote server 110. In some non-limiting embodiments or aspects, switch reporting device 104 determines a switch is not a monitored switch and/or is associated with an object on the wayside capable of transmitting data associated with a switch position. In some non-limiting embodiments or aspects, switch reporting device 104 determines a switch position including any position of one or more positions of the unmonitored switch 108 associated with the alignment of a railway switch. In some non-limiting embodiments or aspects, switch reporting device 104 determines a switch in any position based on a switch position indicator (e.g., a physical or electrical switch position indicator provided on a switch, relaying the currently configured switch alignment of the unmonitored or monitored switch). In some non-limiting embodiments or aspects, the switch reporting device 104 determines an unmonitored switch 108 based on a switch position indicator signaling a normal position of entry on a normal leg of a switch or a switch position indicator signaling a reverse position of entry on a reverse leg of a switch.

In a non-limiting embodiment or aspect, switch reporting device 104 (e.g., a custom application, etc.) executes and/or operates on a mobile device 106 (e.g., a smart cellular phone, handheld device, etc.) to gather information about the switch position and location. In some non-limiting embodiments or aspects, switch reporting device 104 communicates (e.g., sends or receives) switch information to the remote server 110 (e.g., central dispatching center) for system status update and archiving. In some non-limiting embodiments or aspects, after train 10 passes a switch in the railway, the train 10 stops for a member of the train crew to depart the train with a switch reporting device 104, to configure or place the switch into a correct position (e.g., switch alignment). In some non-limiting embodiments or aspects, a crew member will determine switch position data (e.g., capture a picture of the switch, acquire an image of the switch position indicator, acquire a quick response ("QR") code from a QR code associated with, attached, and/or provided by the switch (e.g., an identifying QR code for each possible switch position), the identifying (e.g., unique, specified, etc.) switch name, and/or a location designation for the switch). In some non-limiting embodiments or aspects, after acquiring a picture and/or scan, switch reporting device 104 generates switch position data including at least one or more of a picture, a QR code information, a timestamp and/or GPS location. Switch reporting device 104 generates a message to be sent to the dispatching system based on the switch position data.

In a non-limiting embodiment or aspect, switch reporting device 104 and/or remote server 110 verifies or authenticates the position of the unmonitored switch through the combination of this Information. In some non-limiting embodiments or aspects, switch reporting device 104 and/or remote server 110 archives at least partially, the switch position data for future reference. In some non-limiting embodiments or aspects, switch reporting device 104 generates and communicates a report of the position of one or more unmonitored switches once they have been traversed to accurately record a position to the remote server 110 (e.g., dispatching system) for future accessibility.

As shown in FIG. 2, at step 204, process 200 includes capturing an image of one or more portions of the unmonitored switch 108. In some non-limiting embodiments or aspects, switch reporting device 104 captures an image of one or more portions associated with the unmonitored switch 108. By way of example, a first portion of the unmonitored switch 108 may be associated with detecting or determining a first condition or parameter of unmonitored switch 108 and a second portion of the unmonitored switch 108 may be associated with detecting and/or determining a second condition or parameter of the unmonitored switch 108. In some non-limiting embodiments or aspects, the first portion is associated with a physical parameter of the unmonitored switch 108 and the second portion is associated with a code or attachment on the unmonitored switch 108. For example, the code or attachment includes a coded parameter including information about the unmonitored switch 108.

In some non-limiting embodiments or aspects, switch reporting device 104 receives or determines information associated with a switch code of an unmonitored switch 108. By way of example, unmonitored switch 108 may provide one or more switch codes. In some non-limiting embodiments or aspects, unmonitored switch 108 may provide a code on at least one of a first portion and a second portion of an unmonitored switch 108. In some non-limiting embodiments or aspects, switch reporting device 104 determines the switch code including embedded switch code information associated with identifying the unmonitored switch 108 and/or a status or positioning of the unmonitored switch 108. For example, switch reporting device 104 receives or determines switch code information for identifying a position of the unmonitored switch 108, by acquiring an image of one or more portions of the unmonitored switch 108.

In a non-limiting embodiment or aspect, switch reporting device 104 acquires one of a plurality of switch codes, wherein a first switch code identifies a specified first position of the unmonitored switch 108, and one or more second switch codes identify one or more specified second positions of the unmonitored switch 108. By way of example, in some non-limiting embodiments or aspects, switch reporting device 104 acquires switch code data based on the one or more switch codes from a switch code attached, associated with, and/or transmitted from an unmonitored switch 108. In a non-limiting embodiment or aspect, switch reporting device 104 determines if a switch code is accessible in one or more portions associated with the unmonitored switch 108 before acquiring an image of the one or more portions associated with the unmonitored switch 108.

In a non-limiting embodiment or aspect, switch reporting device 104 acquires an image of a plurality of switch codes and at least one of the plurality of switch codes is acquired at least partially from the image of one or more portions. For example, switch reporting device 104 acquires an image of one or more portions of an unmonitored switch 108 and at least one of the one or more portions of an unmonitored switch 108 includes a switch code. In some non-limiting embodiments or aspects, unmonitored switch 108 includes a switch code in more than one of the one or more portions of the unmonitored switch 108 and/or includes an image of a plurality of switch codes in one of one or more portions of the unmonitored switch 108. In some non-limiting embodiments or aspects, the unmonitored switch 108 includes a first switch code identifying a first position of the unmonitored switch 108, and one or more second switch codes identifying one or more second positions of the unmonitored switch 108.

In a non-limiting embodiment or aspect, switch reporting device 104 acquires an image of a plurality of switch codes and at least one of the plurality of switch codes is acquired at least partially by remote sensing of the switch position without a crew intervention. For example, switch reporting device 104 acquires an image of one or more portions of an unmonitored switch 108 and at least one of the one or more portions of an unmonitored switch 108 includes a switch code. In some non-limiting embodiments or aspects, unmonitored switch 108 includes a switch code in more than one of the one or more portions of the unmonitored switch 108 and/or includes an image of a plurality of switch codes in one of one or more portions of the unmonitored switch 108. In some non-limiting embodiments or aspects, the unmonitored switch 108 includes a first switch code identifying a first position of the unmonitored switch 108, and one or more second switch codes identifying one or more second positions of the unmonitored switch 108.

In a non-limiting embodiment or aspect, switch reporting device senses remotely, the switch position without a crew intervention. For example, switch reporting device 104 includes embedded sensors (e.g., the EOT device (EOT) in the last railcar of a train includes embedded sensors, etc.) to sense a switch position as the train traverses a switch location before the crew is required to report the position of the switch via an unmonitored switch report. In some non-limiting embodiments, an EOT device (EOT) automates or partially automates the process with a visual camera or machine vision (e.g., LIDAR, Ultrasound, Radar, infrared vision, thermal vision, etc.) to capture, sense, or convert the switch position and use the existing communication link between the switch reporting device 104 to send that information to the central office.

As shown in FIG. 2, at step 206, process 200 includes generating switch position data based on the image of one or more portions associated with the unmonitored switch 108. In some non-limiting embodiments or aspects, switch reporting device 104 generates switch position data based on the image of one or more portions associated with the unmonitored switch 108.

In a non-limiting embodiment or aspect, switch reporting device 104 determines, receives, and/or communicates switch position data including at least one of a switch position indicator of the unmonitored switch 108 or switch position information for determining a switch position of the unmonitored switch 108. In some non-limiting embodiments or aspects, the switch position data additionally, and/or alternatively, includes a switch identifier, a location designation based on a location of the unmonitored switch 108 in a geographic area, and a time stamp identifying a time the unmonitored switch 108 was in a position.

In some non-limiting embodiments or aspects, switch reporting device 104 generates switch position data to include an image of a switch position indicator based on a first portion of the image of one or more portions of the image. In some non-limiting embodiments or aspects, switch reporting device 104 generates switch position data to include switch position information based on a first portion or a second portion of the image of one or more portions of the unmonitored switch 108.

As shown in FIG. 2, at step 208, process 200 includes transmitting switch position data to the wayside data management center. In some non-limiting embodiments or aspects, switch reporting device 104 transmits switch position data to a remote server 110 (e.g., a wayside data management center, a dispatcher, a central dispatcher, a server associated with another entity, etc.).

In a non-limiting embodiment or aspect, switch reporting device 104 communicates, updates or transmits switch position data to a remote server 110 (e.g., wayside management center, dispatch center, and/or central computer). In some non-limiting embodiments or aspects, switch position data includes a switch identifier, a location designation based on a location of the unmonitored switch 108 in a geographic area, and a time stamp identifying a time the unmonitored switch 108 was in a position.

As shown in FIG. 2, at step 210, process 200 includes updating a switch position record for an unmonitored switch 108 with switch position data. In some non-limiting embodiments or aspects, switch reporting device 104 updates a switch position record for the unmonitored switch 108 with the switch position data.

In a non-limiting embodiment or aspect, remote server 110 (e.g., wayside management center, dispatch center, and/or central computer) receives, updates or generates switch position data for updating a switch position record. In some non-limiting embodiments or aspects, switch position data includes a switch identifier, a location designation based on a location of the unmonitored switch 108 in a geographic area, and a time stamp identifying a time the unmonitored switch 108 was in a position.

In a non-limiting embodiment or aspect, remote server 110 receives the switch position data (e.g., wayside management center, dispatch center, and/or central computer). In some non-limiting embodiments or aspects, the remote server 110 receives switch position data including a switch identifier, a location designation based on a location of the unmonitored switch 108 in a geographic area, and a time stamp identifying a time the unmonitored switch 108 was in a position. In some non-limiting embodiments or aspects, in response to receiving the switch position data, remote server 110 identifies a switch record of the switch database 124 based on at least one of the switch identifier, a location designation, or a time stamp.

In a non-limiting embodiment or aspect, remote server 110 updates the switch position data (e.g., current switch position, past switch position, etc.) stored in a switch database 124. In some non-limiting embodiments or aspects, the remote server 110 updates switch position data based on a switch identifier, a location designation based on a location of the unmonitored switch 108 in a geographic area, and/or a time stamp identifying a time the unmonitored switch 108 was in a position. In some non-limiting embodiments or aspects, in response to receiving the switch position data, remote server 110 updates a record based on identifying a switch record of the switch database 124 based on at least one of the switch identifier, a location designation, or a time stamp.

In a non-limiting embodiment or aspect, remote server 110, determines a current switch position of an unmonitored switch 108 based on at least one of a switch position indicator of the unmonitored switch 108 or switch position information including parameters and conditions of the unmonitored switch 108. For example, in some non-limiting embodiments or aspects, remote server 110 determines a current switch position of an unmonitored switch 108 based on a switch position indicator of the unmonitored switch 108. For example, remote server 110 receives an image or a switch code associated with a switch position indicator of the unmonitored switch 108. In a non-limiting embodiment or aspect, remote server 110 determines a current switch position of an unmonitored switch 108 based on switch position information, including parameters and conditions of the unmonitored switch 108. For example, in some non-limiting embodiments or aspects, remote server 110, receives an image of a switch (e.g., switch position indicator, a signal, and/or another portion of the switch). For example, remote server 110 determines based on the image of the switch, a position of a switch.

In a non-limiting embodiment or aspect, remote server 110 updates switch position data for determining or generating a switch position record. In some non-limiting embodiments or aspects, remote server 110 updates switch position data for determining either directly or indirectly (e.g., remotely, automatically, locally, programmatically with database queries, etc.) a correct switch position of the unmonitored switch 108. For example, remote server 110, includes an algorithm (e.g., a program, query, and/or script) to determine a correct switch position of the unmonitored switch 108 based on the current switch position and a recorded switch position. In some non-limiting embodiments or aspects, a user may determine a correct position based on the switch position data or information derived from the switch position data. For example, remote server 110 may generate or determine switch information based on the switch position data to include a hint or instruction as to the correct position (e.g., current position of the physical switch in the railway, expected position, etc.) may be automatically generated. In some non-limiting embodiments or aspects, the recorded switch position is associated with a position of the switch in a switch record of the switch database 124.

In a non-limiting embodiment or aspect, remote server 110 sends instructions or notifications to the switch reporting device 104 for configuring the unmonitored switch 108 from a first position to a second position. For example, a user of the switch reporting device 104 configures the unmonitored switch 108 by changing the position of the switch based on the instructions or notification from the remote server 110. In some non-limiting embodiments or aspects, a user of the switch reporting device 104 configures the unmonitored switch 308 by changing the position of the switch based on the instructions or notification from the remote server 110 after configuring the unmonitored switch 108.

Figure 3A:
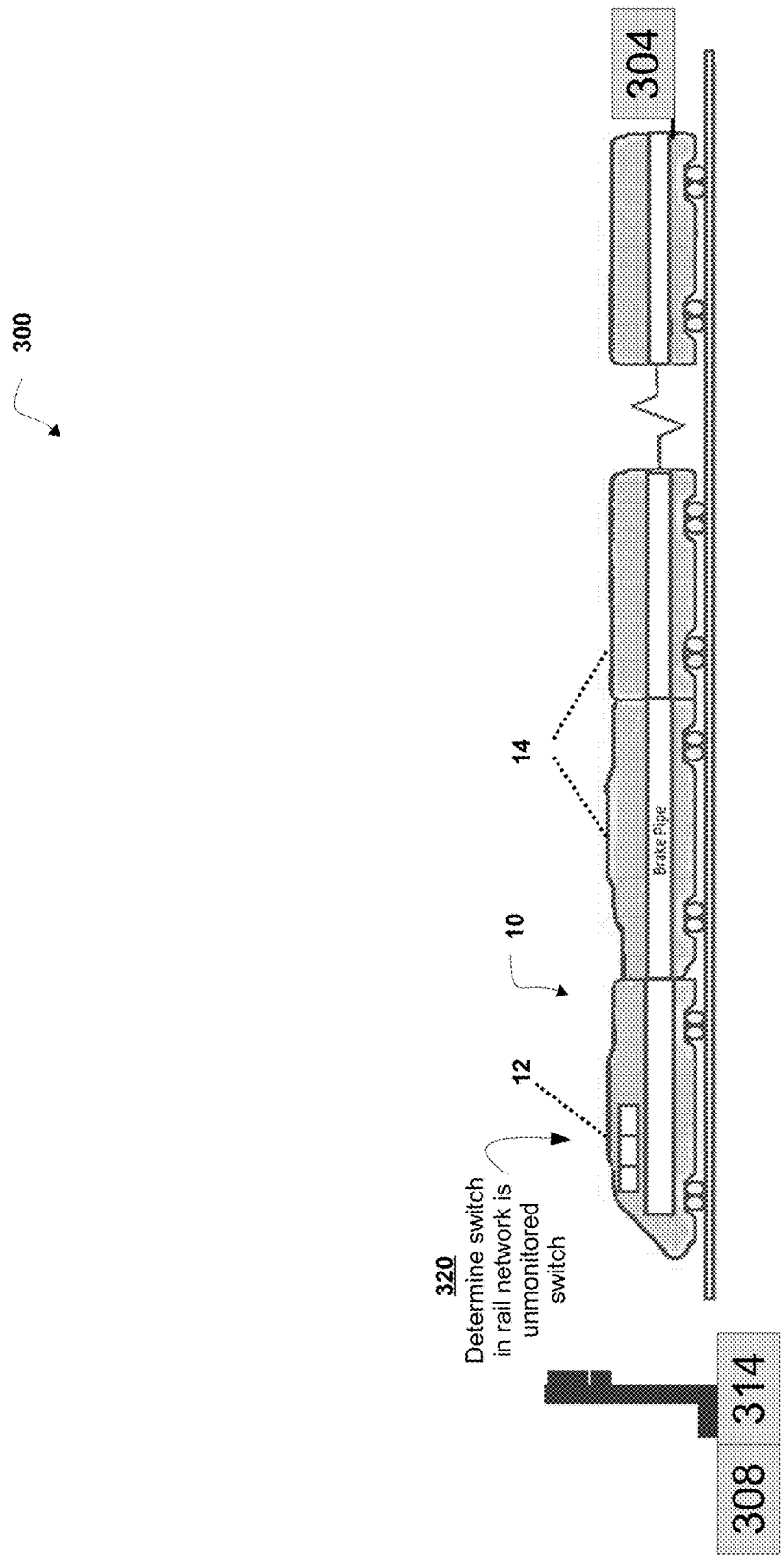
FIGS. 3A-3C illustrate an implementation of a non-limiting embodiment or aspect of a process disclosed herein according to a non-limiting embodiment or aspect.
Figure 3B:
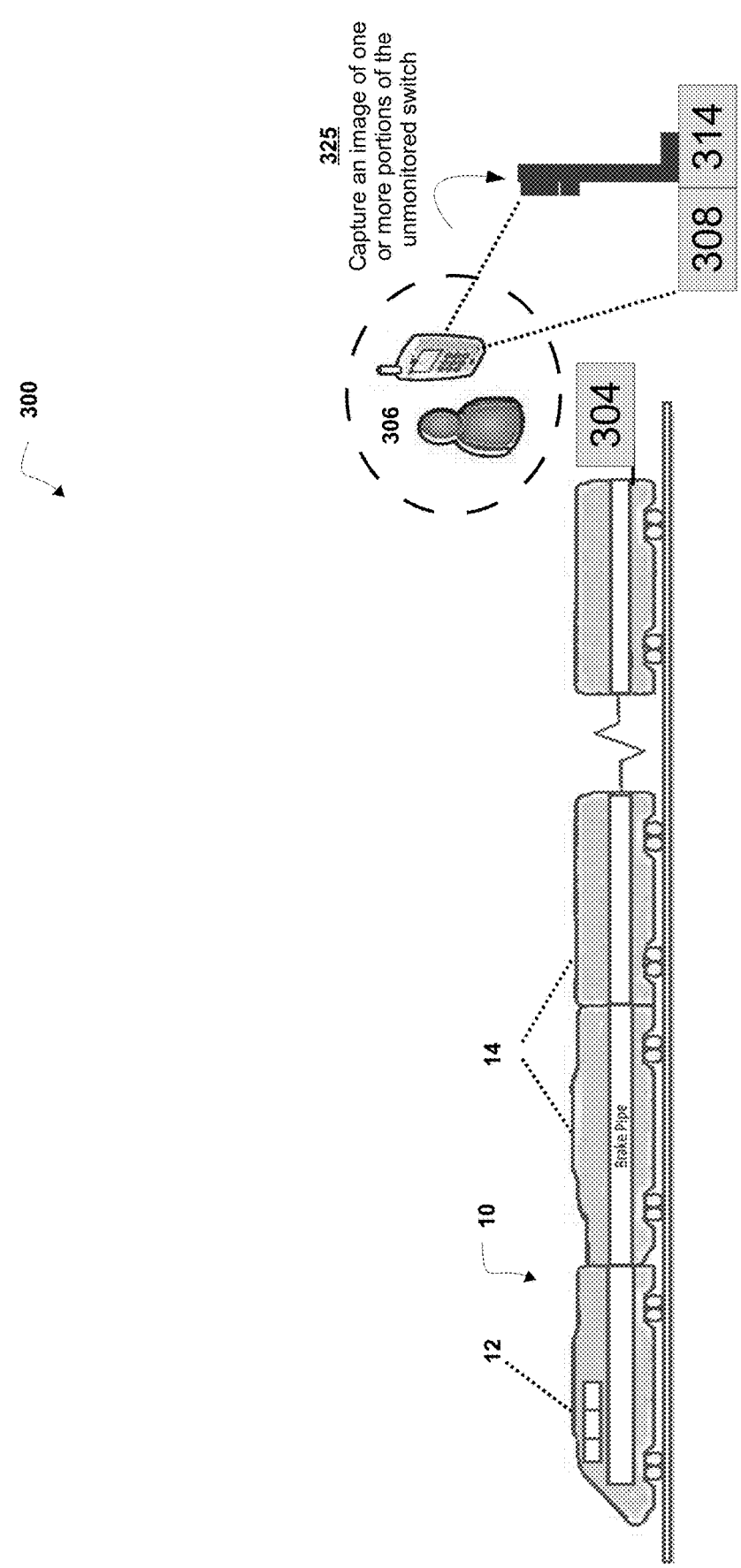
Figure 3C:
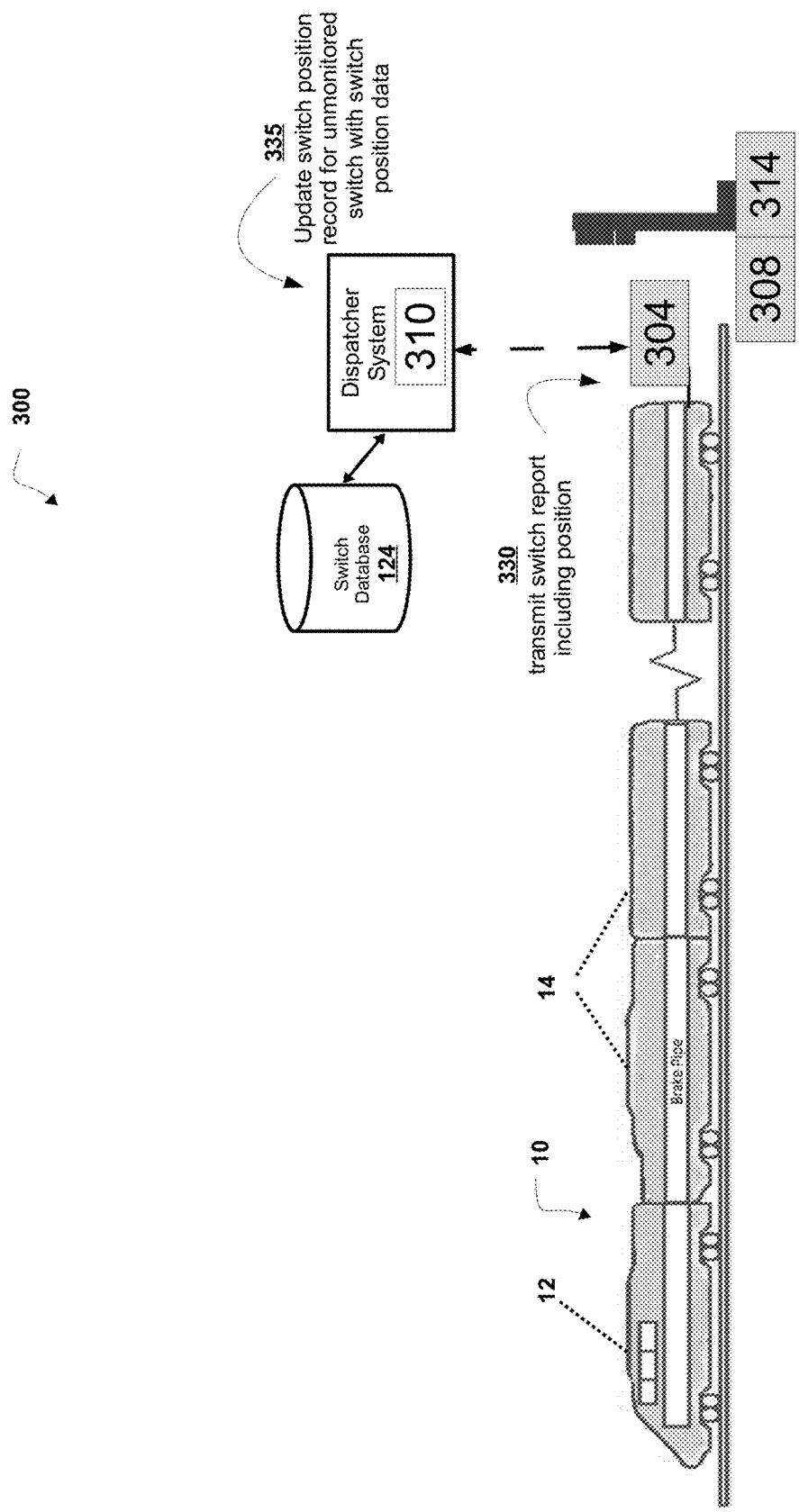

Referring now to FIGS. 3A-3C, FIGS. 3A-3C are diagrams of an overview of a non-limiting embodiment or aspect of an implementation 300 relating to a switch reporting system 100. As shown in FIGS. 3A-3C, implementation 300 may include a train 10, a switch reporting device 304, and an unmonitored switch 308. In some non-limiting embodiments or aspects, switch reporting device 304 may be the same or similar to switch reporting device 104. In some non-limiting embodiments or aspects, unmonitored switch 108 may be the same or similar to unmonitored switch 308. In some non-limiting embodiments or aspects, dispatcher system 310 may be the same or similar to remote server 110.

As shown by reference number 320 in FIG. 3A, train 10 determines a switch in a railway is an unmonitored switch 308. For example, switch reporting device 304 determines an unmonitored switch 308 in the approach on the wayside (e.g., not directly, indirectly, or automatically communicating a switch position to a remote server). In some non-limiting embodiments or aspects, switch reporting device 304 and/or on-board computer 302 determines a switch is a monitored switch and/or is associated with an object on the wayside capable of transmitting data associated with a switch position (e.g., updating a switch position record). In some non-limiting embodiments or aspects, switch reporting device 304 determines a switch position including any position of one or more positions of the unmonitored switch 308 associated with the alignment of a railway switch.

As shown by reference number 325 in FIG. 3B, train 10 captures an image of one or more portions of the unmonitored switch 308. For example, switch reporting device 304 provides increased reliability and documented means of reporting unmonitored switches.

In a non-limiting embodiment or aspect, a train 10 monitors an unmonitored switch 308 until the train 10 passes the unmonitored switch 308 to be reported. In some non-limiting embodiments or aspects, an EOT device (EOT) and/or a switch reporting device 304 automatically captures an image of one or more portions of the unmonitored switch 308. For example, EOT device (EOT) acquires an image of one or more portions of the unmonitored switch 308 to report and/or verify that the switch is in a proper (e.g., correct) position. In some non-limiting embodiments or aspects, if an unmonitored switch 308 is not positioned correctly, the unmonitored switch 308 is configured properly after the train 10 passes. Once the switch is in the proper position, a crew member updates a position of the unmonitored switch 308 with the switch reporting device 304.

In some non-limiting embodiments or aspects, the switch reporting device 304 is operated to capture a picture of the unmonitored switch 308 in a manner that allows for proper recording of the switch position. In some non-limiting embodiments or aspects, the switch reporting device 304 acquires an appropriate QR code for the unmonitored switch 308 based on a position. In some non-limiting embodiments or aspects, the switch reporting device 304 acquires a QR code for a current, new, and/or configured position of the unmonitored switch 308. In some non-limiting embodiments or aspects, switch reporting device 304 generates a packet of information to be transmitted to the dispatcher system 310 and stored or updated in a switch database 324 including an application for reporting to a dispatcher and/or archiving for future reference.

In a non-limiting embodiment or aspect, a train monitors an unmonitored switch 308 until it has been recorded by a train crew member using a switch reporting device 304 (e.g., processing using a software application).

As shown by reference number 330 in FIG. 3C, train 10 transmits switch report including position. For example, switch reporting device 304 transmits switch position data to a dispatcher system 310. For example, in a non-limiting embodiment or aspect, switch reporting device 304 transmits switch data to the dispatcher system 310 for archival and viewing by other required personnel (e.g., a dispatcher to verify the correct positioning of the switch and enter this switch status into a track system, a crew member to verify correct positioning of the switch, a Quality Control manager to review historical information about any switches on the system, etc.).

As shown by reference number 335 in FIG. 3C, train 10 updates one or more switch position records for unmonitored switches with switch position data. For example, switch reporting device 304 updates one or more switch position records for unmonitored switches with switch position data.

In a non-limiting embodiment or aspect, switch reporting device 304 may not be able to communicate directly with a dispatcher system 310. In some non-limiting embodiments or aspects, an encoded hash number is used when there is inadequate (e.g., limited or no service, etc.) cellular service in the area where the unmonitored switch position is to be reported. For example, switch reporting device 304 generates, determines or collects the switch position data, but instead of this information being transmitted immediately back to the dispatcher system 310, a verification number (e.g., a PIN number, encoded hash number, a token, etc.) is generated and sent to a dispatcher associated with the dispatcher system 310 via radio. This number contains information which will be aligned with information at a dispatch center. In some non-limiting embodiments or aspects, the verification number when entered into the system will provide required information needed to verify the detailed information about the unmonitored switch 308.

In a non-limiting embodiment or aspect, switch reporting device 304 or dispatcher system 310 provide switch position archiving. In some non-limiting embodiments or aspects, a remote server application includes the archiving of any switch position data and/or information received related to a switch report for reference, analysis, and report generation (e.g., historical positioning trends of a specific switch, maintenance requirements of a switch, investigations of any anomaly in the operation of the system, etc.). In some non-limiting embodiments or aspects, switch position data and/or a switch position report verifies a position (e.g., correct position, etc.) associated with a switch in a switch record. In some non-limiting embodiments or aspects, switch position data and/or a switch position report verifies an incorrect position associated with a switch in a switch record.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the description. For example, it is to be understood that the present invention contemplates that, to the extent possible, one or more features of any embodiments or aspects can be combined with one or more features of any other embodiment or aspect.

What is claimed is:

1. A computer-implemented method for determining a position of an unmonitored switch in a railway, the method comprising:
   capturing an image of the unmonitored switch;
   generating switch position data based on the image of the unmonitored switch, the switch position data including a switch identifier, a geographic location of the unmonitored switch, and a time that the unmonitored switch was in a first position; and
   updating a switch position record for the unmonitored switch with the switch position data.

2. The method of claim 1, wherein the image of the unmonitored switch shows a switch position indicator of the unmonitored switch, and further comprising:
   generating the switch position data to include the image of the unmonitored switch that shows the switch position indicator and switch position information that is based on the image of the unmonitored switch.

3. The method of claim 1, further comprising:
   monitoring the image of the unmonitored switch for a switch code that includes embedded switch code information associated with a status of the unmonitored switch, the switch code information including information for identifying the first position of the unmonitored switch;
   determining whether the switch code is accessible in the image of the unmonitored switch; and
   acquiring switch code data based on the switch code.

4. The method of claim 3, wherein the switch code is a first switch codes of plural switch codes that identify different positions of the unmonitored switch that include the first position of the unmonitored switch.

5. The method of claim 1, wherein generating the switch position data includes identifying a switch code from the image, the switch code indicating the first position of the unmonitored switch.

6. The method of claim 1, wherein updating the switch position record for the unmonitored switch further comprises:
   communicating the switch position data to a wayside data management center;
   receiving the switch position data;
   in response to receiving the switch position data, identifying the switch position record based on at least one of the switch identifier, the geographic location, or the time;
   determining the first position of the unmonitored switch based on at least one of a switch position indicator of the unmonitored switch or switch position information including parameters and conditions of the unmonitored switch;
   determining a correct switch position of the switch based on the first position and a recorded switch position, the recorded switch position associated with a recorded position of the switch in the switch record; and
   updating the switch record with the correct switch position.

7. The method of claim 1, comprising:
   changing the unmonitored switch from the first position to a second position after a train has passed the unmonitored switch; and
   capturing the image of the unmonitored switch after changing the unmonitored switch.

8. A switch management system comprising:
   a mobile device having at least one display screen, a camera, a code reader, at least one memory, and one or more processors, the mobile device configured to:
   capture an image of an unmonitored switch;
   generate switch position data based on the image of the unmonitored switch, the switch position data including a switch identifier, a geographic location of the unmonitored switch, and a time that the unmonitored switch was in a first position; and
   update a switch position record for the unmonitored switch with the switch position data.

9. The switch management system of claim 8, wherein the image of the unmonitored switch shows a switch position indicator of the unmonitored switch, and the mobile device is further configured to:
   identify a switch code from the image of the unmonitored switch;
   generate the switch position data to include the image of the switch position indicator and the switch code.

10. The switch management system of claim 8, wherein the mobile device is configured to:
    provide one or more switch codes in one or more portions associated with the unmonitored switch, the switch code including an identifier of the first position of the unmonitored switch;
    determine whether a switch code that identifies the first position of the unmonitored switch is viewable in the image; and
    acquire switch code data based on the switch code.

11. The switch management system of claim 10, wherein the switch code is a first switch code of plural switch codes that represent different positions of the unmonitored switch.

12. The switch management system of claim 11, wherein the mobile device is configured to acquire the first switch code from the image of the unmonitored switch.

13. The switch management system of claim 8, wherein the mobile device is configured to:
    communicate the switch position data to a wayside data management center.

14. The switch management system of claim 8, wherein the mobile device is configured to:
    capture the image of the unmonitored switch after the unmonitored switch is adjusted by a wayside device from the first position to a second position.

15. A method, comprising:
    issuing an electronic command to at least one device onboard a train to operate a camera for capturing an image of a switch;
    generating, by the at least one device, switch position data based on the image of the switch, the switch position data including a position of the unmonitored switch; and
    communicating, by the at least one device, a status update to a dispatcher, the status update including the switch position data for identifying the unmonitored switch and the position of the unmonitored switch.

16. The method of claim 15, further comprising:
    receiving the status update at the dispatcher including one or more processors;
    in response to receiving the switch position data, identifying, by the dispatcher, a switch record based on at least one of a switch identifier, a location designation, or a time stamp;
    determining the position of the unmonitored switch based on the switch position data;
    determining a correct switch position of the switch based on the switch position data and a recorded switch position, the recorded switch position associated with a recorded position of the unmonitored switch in the switch record; and updating the switch record with the correct switch position.

17. The method of claim 15, wherein the position of the unmonitored switch is a first position, and further comprising:

changing the unmonitored switch from the first position to a second position that is different from the first position after the train has passed the unmonitored switch; and capturing the image of the unmonitored switch after changing the unmonitored switch from the first position to the second position.

18. The method of claim 15, wherein the switch position data includes at least one of a switch position indicator of the unmonitored switch or switch position information for determining the position of the unmonitored switch, the method further comprising:

generating the switch position data based on the switch position indicator and on switch position information of a second portion of the image of the unmonitored switch.

\* \* \* \* \*